UNITED STATES PATENT OFFICE.

EDWIN C. WEISGERBER, OF THE UNITED STATES ARMY.

VALVE-PACKING GREASE.

1,384,714. Specification of Letters Patent. Patented July 12, 1921.

No Drawing. Application filed January 10, 1919. Serial No. 270,569.

(FILED UNDER THE ACT OF MARCH 3, 1883, 22 STAT. L., 625.)

*To all whom it may concern:*

Be it known that I, EDWIN C. WEISGERBER, captain, Corps of Engineers, United States Army, a citizen of the United States, stationed at Washington, D. C., have invented an Improvement in Valve-Packing Grease, of which the following is a specification.

The invention described herein may be used by the Government, or any of its officers or employees in prosecution of work for the Government, or by any other person in the United States, without payment of any royalty thereon.

This invention relates to valve packing grease. Heretofore such grease has never withstood climatic conditions, in that it would either harden, corrode, evaporate, soften or freeze, whereupon the valve would leak. The present invention overcomes all these disadvantages, besides keeping the valve stem well lubricated, and the grease is very simple and cheap to make.

The grease comprises the following:

25 lbs. tallow,
1 lb. soap,
1 lb. beeswax,
1 gal. neutral oil.

The soap above specified is preferably of the composition of the commercial article called ivory soap.

The grease is made by melting the tallow and the soap, allowing the soap to dissolve in the hot tallow, and keeping the mixture hot, then adding the neutral oil and beeswax. This mixture should be heated into a liquid state, before dipping in the packing.

What I claim as my invention is:

A valve packing grease comprising in approximately the proportions following:

Tallow_____ 25 lbs.
Soap_____ 1 lb.
Beeswax_____ 1 lb.
Neutral oil_____ 1 gal.

EDWIN C. WEISGERBER.